Patented July 4, 1950

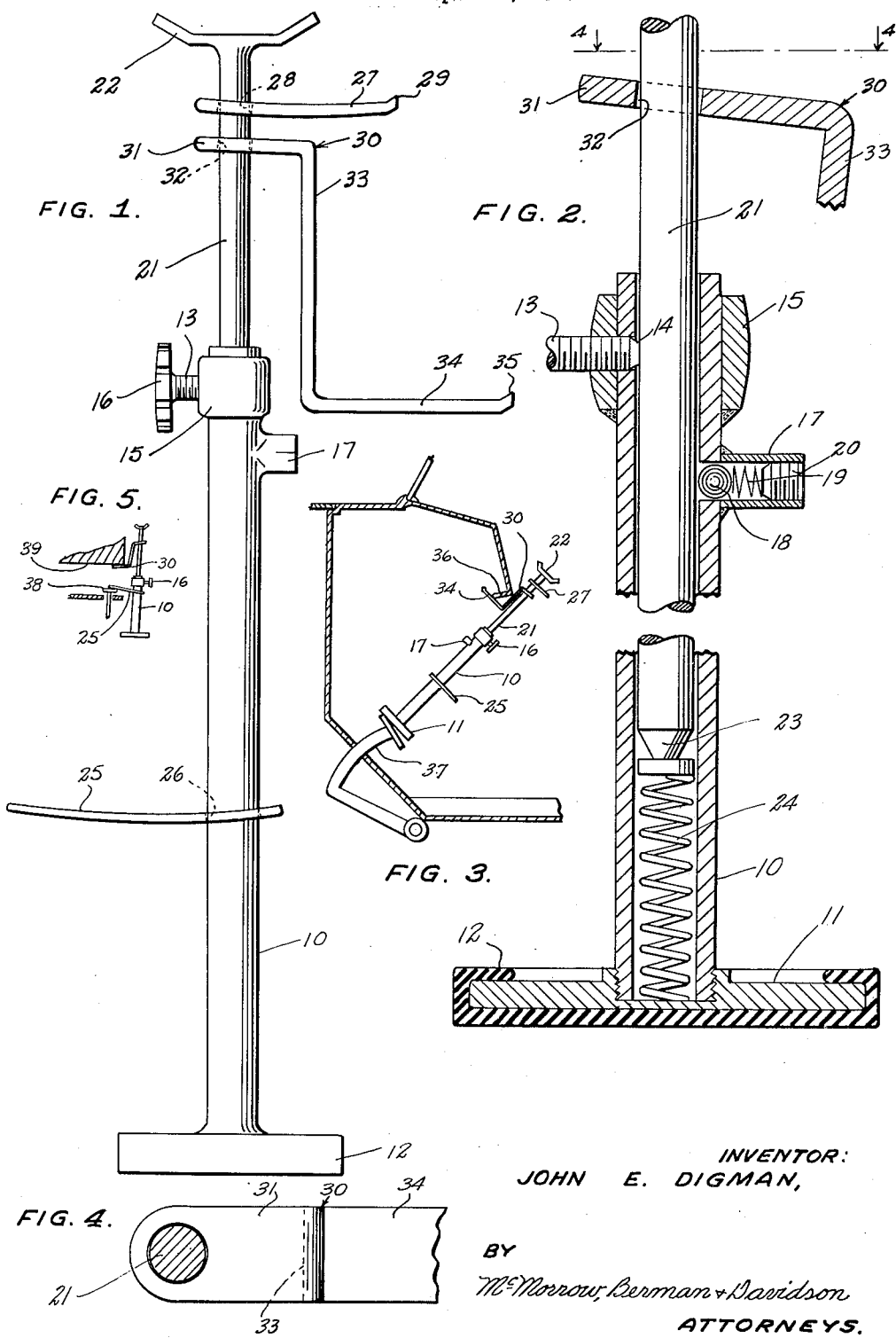

2,513,850

UNITED STATES PATENT OFFICE 2,513,850

PEDAL DEPRESSOR TOOL

John E. Digman, Takoma Park, Md.

Application September 26, 1947, Serial No. 776,348

1 Claim. (Cl. 254—1)

My invention relates to tools for holding a pedal, plunger, or any like device in any selected elevated or depressed position, and is particularly adapted to hold the brake or clutch pedal of a motor vehicle in a selected depressed or elevated position when the nature of the work to be done upon the vehicle requires such depression or elevation of the pedals.

With the foregoing in view, an object of my invention is to provide an improved tool of the class described.

A further object of the invention is to provide an improved tool for the bleeding of hydraulic brakes which comprises a pair of telescopic parts, spring means for loading said parts to an extended position, and means adjustable longitudinally of one of said parts to provide an abutment for engaging beneath the dashboard of an automobile or other vehicle.

A further object is to provide an improved tool of the class described which includes telescopic parts, means for locking such parts in telescopically-adjusted relationship, and means individually adjustable on each part for engagement with a work piece or a stationary base.

A further object is to provide an improved tool of the class described which includes telescopic parts, spring means carried by one part, loading said parts for relative movement to a telescopically-extended position, and a spring latch carried by one part and engageable with a spring latch-receiving recess formed in the other part to limit the telescopic extension of said parts under the load of said spring.

Other objects and advantages reside in the particular structure of the invention, combination and arrangement of the several parts thereof, and will be readily understood by those skilled in the art upon reference to the accompanying drawings in connection with the following specification, wherein the invention is shown, described and claimed.

In the drawings:

Figure 1 is an elevation of a tool according to the invention;

Figure 2 is an enlarged longitudinal vertical section thereof with parts broken away;

Figure 3 is a fragmentary reduced longitudinal vertical section through a part of a motor vehicle showing one use of the tool;

Figure 4 is a transverse horizontal section taken substantially on the plane of the line 4—4 of Figure 2.

Figure 5 is a diagrammatic elevation with parts being shown in vertical section showing a further use of the device of the invention.

Referring specifically to the drawings, wherein like reference characters have been used throughout to designate like parts, 10 designates an upright tubular member adapted to be supported upon a substantially flat base 11 at the bottom end thereof, and which base member 11 is preferably covered by a removable covering 12 of resilient material, such as rubber or the like. The opposite end of the tubular member 10 is provided with a radial bore 14 through which extends the threaded stem 13 of a thumb screw 16 which is threaded through a collar 15 fixed around such end of the tubular member in any suitable manner, as by welding. A radially-directed tubular boss 17 is formed on the tubular member 10 adjacent the upper end thereof and has seated therein a latch member 18 which is pressed radially inwardly by any suitable spring member 19 held in place in the boss 17 by any suitable plug 20.

A shaft member 21 is slidably and telescopically mounted in the tubular member 10 and is formed to provide a work-engaging head 22 on the outer free end thereof. The telescoped free end of the shaft 21 is formed to provide a latch recess 23 which is substantially annular in form and extends entirely around the lower end of the shaft 21, whereby to be engaged with the latch 18 irrespective of whether or not the shaft 21 has been rotated relative to the tubular base 10. A spring 24 is interposed between the telescoped inner end of the shaft 21 and the base 11 forming the floor for the tubular member 10. It is apparent from the foregoing that the spring 24 loads the shaft 21 for telescopic movement in an extended direction relative to the tubular member 10. At the same time, accidental separation of the members 10 and 21 is prevented by the automatic engagement of the spring latch 18 with the latch recess 23 when the telescoped end of the shaft is projected to a point opposite said latch. At the same time, the parts are readily separated by disengaging the notch 23 from the latch and continuing the telescopic extension of the members.

The member 10 is provided with an adjustable work-supporting abutment 25 which is formed adjacent one end thereof with an aperture 26 therethrough which is sized for a loose fit on the member 10. The abutment 25 is preferably slightly arcuate in elevation, as shown in Figure 1, whereby to provide a substantially horizontal work-supporting upper surface when engagement of the abutment with a work-supporting surface has canted the abutment slightly so that the diagonally-opposite bottom and top edges of the aperture 26 are forced into frictional engagement with the tubular member 10, whereby to lock the abutment in a longitudinally-adjusted position relative to said tubular member. The shaft 21 outwardly of the tubular member 10 is provided with one or more work-engagement abutments 27 and 30. The abutment 27 comprises a plate-like element having an aperture 28 formed therethrough for a sliding engagement with the shaft 21. The toe or outer free end of the abutment 27 is upwardly turned, as at 29, to provide a relatively sharp edge for digging into wood or other soft work pieces, and also to prevent slipping of the abutment 27 from beneath a work piece engaged by the same. The abutment 30 is substantially Z-shaped in elevation and comprises an upper horizontal portion 31 having an aperture 32 formed therethrough for sliding engagement on the shaft 21. The outer end of the portion 31 is downwardly stepped, as at 33, and thereafter merges into a downwardly-offset horizontal terminal portion 34 having an upwardly-directed free edge or lip 35. Both of the abutments 27 and 30 are longitudinally adjustable on the shaft 21 and upon being canted under the load of a work piece, are frictionally engaged therewith in a well known manner.

One manner of using the invention is demonstrated in Figure 3, wherein the offset portion 34 of the movable abutment 30 is engaged beneath the dashboard 36 of a motor vehicle with the base 11 seated upon a brake or clutch pedal 37 of the vehicle to depress the latter. The device is maintained in the Figure 3 position by holding the pedal 37 depressed by a hand or foot, whereby with the set screw 16 loosened, the spring 24 is operative to position the shaft 21 and abutment 30 properly relative to the dashboard 36. Thereafter, the thumb screw 16 is tightened to maintain the parts in such position and the pedal 37 can be released. It is obvious that in the particular illustration, the head 22 could have been engaged beneath the dashboard 36, or that the tool could be reversed, whereby the head 22 engaged the pedal and the base 11 was seated against the forward edge of the front seat of the vehicle. Also, in the event that it is desired to use the tool to depress a pedal or plunger, where there is substantially little clearance between the normally-projected plunger and a superposed surface, the device can be used as shown diagrammatically in Figure 5. In Figure 5, a plunger 38 is positioned beneath an overhang 39, whereby insufficient room is provided for insertion of the entire tool. In a situation such as this, the movable abutment 25 for the tubular member 10 is moved to a position to overlie the plunger 38 and the tool as a whole is then moved downwardly to depress such plunger. One of the abutments 27 or 30 is then positioned beneath the overhang 39 and allowed to bear thereagainst under the influence of the spring 24. The thumb screw 16 may now be tightened to maintain the parts in the positions shown. It is obvious that the device may be used in many other manners to suit a given situation, and using one or more of the adjustable abutments 25, 27 or 30.

A further use for the invention comprises utilizing the same to bleed hydraulic brake lines of air contained therein. When used for this purpose, it is customary for one mechanic to take a position beneath the vehicle adjacent the brake drum of one wheel thereof and open the bleeding valve of the drum, while another mechanic depresses the brake pedal until signaled to release it by the first mechanic upon the appearance of brake fluid through the bleed valve. The device of my invention eliminates the need for a separate mechanic to depress the brake pedal, in that the device may be hooked beneath the dashboard, as shown in Figure 3, and as previously described except that the set screw 16 is not tightened. The normal pressure in the brake line is strong enough to prevent the spring 24 from depressing the brake pedal until the bleed valve is open. Thereafter, however, opening of the bleed valve permits the spring 24 to move the parts 10 and 21 longitudinally of each other to extended position whereby to continuously depress the brake pedal 37 until brake fluid appears at the bleed valve. The mechanic then turns off the bleed valve. The mechanic then merely moves to another wheel and repeats the performance until all four wheels of the vehicle have been bled. It is not necessary for him to reset the tool after each wheel.

While I have shown and described what is now thought to be the preferred embodiment of my invention, it is to be understood that the same is susceptible of other forms and expressions. Consequently, I do not limit myself to the precise structure shown and described, except as hereinafter claimed.

I claim:

In an extensible tool, the combination with a tubular member, a shaft member telescopic in said tubular member; means projecting from the tubular member for locking said members in adjusted relationship; and work-engaging heads on the opposite ends of said members, of a work-engaging abutment longitudinally adjustable along one of said members, a substantially Z-shaped abutment, said Z-shaped abutment having a portion embracing and engaging the other of said members for adjustment longitudinally thereof, said Z-shaped abutment having its intermediate portion spaced from said telescopic member a sufficient distance to clear the said projecting means and including a work-engaging portion, said work-engaging portion being offset toward said first-named abutment, and separate means for frictionally holding each abutment in a longitudinally-adjusted position.

JOHN E. DIGMAN.

REFERENCES CITED

The following references are of record in the file of this patent:

UNITED STATES PATENTS

| Number | Name | Date |
|---|---|---|
| 1,455,617 | Jackson | May 15, 1923 |
| 1,699,039 | Abrahamson | Jan. 15, 1923 |
| 1,721,227 | Manley | July 16, 1929 |
| 1,989,961 | Winning | Feb. 5, 1935 |
| 2,171,832 | Hoeppner | Sept. 5, 1939 |

FOREIGN PATENTS

| Number | Country | Date |
|---|---|---|
| 356,325 | Great Britain | Sept. 10, 1931 |